(12) United States Patent
Dulle

(10) Patent No.: US 10,076,969 B2
(45) Date of Patent: Sep. 18, 2018

(54) BATTERY SYSTEMS AND METHODS FOR BI-DIRECTIONAL CURRENT CONTROL

(71) Applicant: Johnson Controls Technology Company, Plymouth, MI (US)

(72) Inventor: Ronald J. Dulle, Mequon, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 71 days.

(21) Appl. No.: 15/189,741

(22) Filed: Jun. 22, 2016

(65) Prior Publication Data

US 2017/0001535 A1    Jan. 5, 2017

Related U.S. Application Data

(60) Provisional application No. 62/188,330, filed on Jul. 2, 2015.

(51) Int. Cl.
*H02J 7/00* (2006.01)
*B60L 11/18* (2006.01)

(52) U.S. Cl.
CPC ......... *B60L 11/1861* (2013.01); *H02J 7/0026* (2013.01); *H02J 7/0031* (2013.01); *H02J 7/0068* (2013.01); *Y02T 10/7055* (2013.01)

(58) Field of Classification Search
CPC ... Y02T 90/14; Y02T 10/7005; Y02T 90/128; Y02T 10/7088; Y02T 90/163
USPC ........................................................ 320/109
See application file for complete search history.

(56) References Cited

U.S. PATENT DOCUMENTS

| | | | |
|---|---|---|---|
| 4,996,637 A | 2/1991 | Piechnick |
| 5,233,287 A | 8/1993 | Lenk |
| 5,847,912 A | 12/1998 | Smith et al. |
| 6,008,627 A | 12/1999 | Narita |
| 8,217,628 B2 | 7/2012 | Yang et al. |
| 8,587,907 B2 | 11/2013 | Gaben |
| 8,724,280 B2 | 5/2014 | Andersson et al. |

(Continued)

OTHER PUBLICATIONS

Graovac, Dr. Dusan, Parallel Operation of Power MOSFETs, Infineon Technologies AG 2009, pp. 1-7.

(Continued)

*Primary Examiner* — Arun Williams
(74) *Attorney, Agent, or Firm* — Fletcher Yoder, P.C

(57) ABSTRACT

A battery system may include an energy storage component the couples to an electrical system. The battery system may also include a first semiconductor switching device and a second semiconductor switching device. The first semiconductor switching device and the second semiconductor switching device each selectively couple the energy storage component to the electrical system. Additionally, the battery system may include a first diode coupled in parallel with the first semiconductor switching device and a second diode coupled in parallel with the second semiconductor switching device. Further, the battery system may include a battery management system that controls operation of the first semiconductor switching device and the second semiconductor switching device to selectively couple the energy storage component to the electrical system. The battery management system may selectively couple the energy storage component to the electrical system based on an output current measurement of the energy storage component.

21 Claims, 3 Drawing Sheets

(56) References Cited

U.S. PATENT DOCUMENTS

| | | | |
|---|---|---|---|
| 2001/0054880 A1* | 12/2001 | Haraguchi | H02J 7/0021 |
| | | | 320/134 |
| 2008/0048621 A1 | 2/2008 | Yun | |
| 2009/0072790 A1 | 3/2009 | Ibrahim | |
| 2009/0208821 A1 | 8/2009 | Kosugi et al. | |
| 2013/0101874 A1 | 4/2013 | Pevear | |
| 2015/0214757 A1* | 7/2015 | Zane | H02J 7/0021 |
| | | | 320/107 |

OTHER PUBLICATIONS

PCT/US2016/040546 International Search Report and Written Opinion dated Sep. 20, 2016.

* cited by examiner

BATTERY SYSTEMS AND METHODS FOR BI-DIRECTIONAL CURRENT CONTROL

CROSS-REFERENCE

This application claims priority from and the benefit of U.S. Provisional Application Ser. No. 62/188,330, entitled "SMART BI-DIRECTIONAL CURRENT CONTROL," filed Jul. 2, 2015, which is hereby incorporated by reference in its entirety for all purposes.

BACKGROUND

The present disclosure relates generally to the field of battery systems, and more particularly, to controlling a flow of current to and from battery systems used in vehicular contexts, as well as other energy storage/expending applications.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, the electric power used by the xEVs may be stored in lithium ion batteries and/or lead-acid batteries. Accordingly, it may be beneficial to improve control over operation of the battery system, for example, to manage the coupling and decoupling of the lithium ion battery and the lead-acid battery to the electrical system of the vehicle.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a battery system. The battery system may include an energy storage component the couples to an electrical system. The battery system may also include a first semiconductor switching device and a second semiconductor switching device. The first semiconductor switching device and the second semiconductor switching device each selectively couple the energy storage component to the electrical system. Additionally, the battery system may include a first diode coupled in parallel with the first semiconductor switching device and a second diode coupled in parallel with the second semiconductor switching device. Further, the battery system may include a battery management system that controls operation of the first semiconductor switching device and the second semiconductor switching device to selectively couple the energy storage component to the electrical system. The battery management system may selectively couple the energy storage component to the electrical system based on an output current measurement of the energy storage component.

The present disclosure also relates to an energy storage system. The energy storage system includes an energy storage component and an electrical system of a vehicle. The energy storage system also includes a first semiconductor switching device and a second semiconductor switching device that each selectively couple the energy storage component to the electrical system. Additionally, the energy storage system includes a first diode coupled in parallel with the first semiconductor switching device and a second diode coupled in parallel with the second semiconductor switching device. Further, the energy storage system includes a battery management system that includes a processor and one or more tangible, non-transitory machine-readable media comprising processor-executable instructions. Upon receiving instructions to couple the energy storage component to the electrical system, the instructions instruct the battery management system to provide a first signal to a first gate line of the first semiconductor switching device to activate the first semiconductor switching device. The instructions also instruct the battery management system to receive a measured current of the energy storage component. Furthermore, the instructions instruct the battery management system to provide a second singal to a second gate line of the second semiconductor switching device to activate the second semiconductor switching device when the measured current is greater than a predetermined threshold current. Moreover, the instructions instruct the battery management system to provide a third signal to the second gate line of the second semiconductor switching device to deactivate the second semiconductor switching device when the measured current is less than the predetermined threshold current.

The present disclosure also relates to a tangible, non-transitory computer readable medium of a battery management system that stores instructions executable by a processor. The instructions include instructions to cause the processor to provide a first signal to a first gate line of the first semiconductor switching device to activate the first semiconductor switching device. Activating the first semiconductor switching device enables current to flow from an energy storage component across the first semicondcutor switching device, through a diode coupled in series with the first semiconductor switching device, and to an electrical system. Additionally, the instructions include instructions to cause the processor to receive a measured current of the energy storage component. Further, the instructions include instructions to cause the processor to provide a second singal to a second gate line of a second semiconductor switching device to activate the second semiconductor switching device when the measured current is greater than a predetermined threshold current. Activating the second semiconductor switching device enables current to flow from the first semiconductor switching device, across the second semiconductor switching device, and to the electrical system. Furthermore, the instructions include instructions to cause the processor to provide a third signal to the second gate line of the second semiconductor switching device to deactivate the second semiconductor switching device when the measured current is less than the predetermined threshold current. Deactivating the second semiconductor switching device enables current to flow across the first semiconductor switching device, through the diode coupled in series with the first switching device, and to the electrical system.

DRAWINGS

Various aspects of this disclosure may be better understood upon reading the following detailed description and upon reference to the drawings in which.

DETAILED DESCRIPTION

Figure 1:
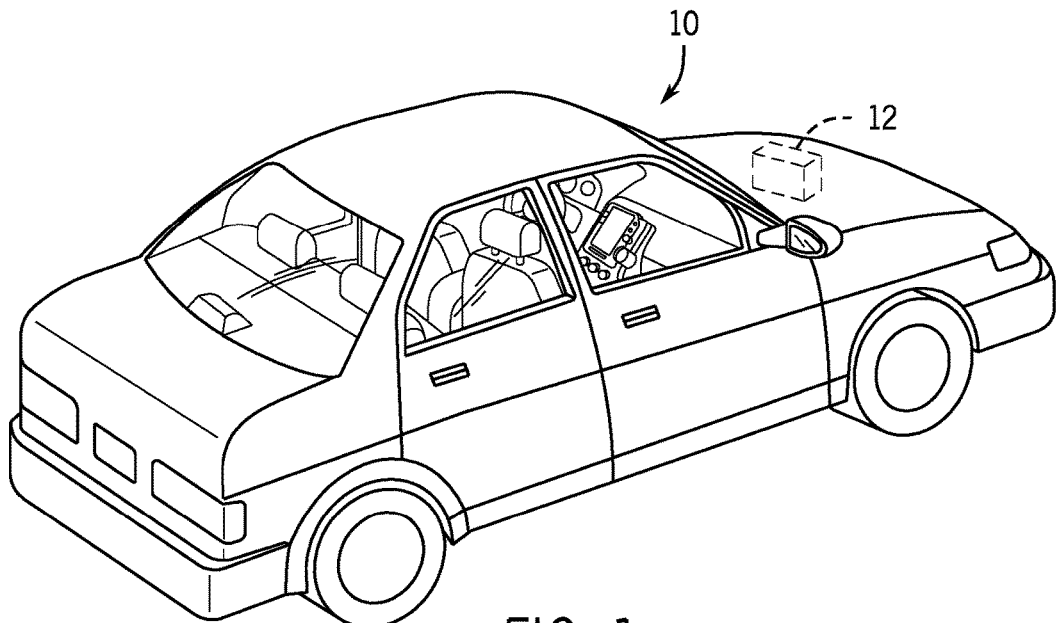
FIG. 1 is perspective view of a vehicle (an xEV) having a battery system contributing all or a portion of the power for the vehicle, in accordance with an embodiment of the present approach;.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems). Additionally, it may be appreciated that the battery systems described herein may also be used to provide power to various electrical components of traditional gasoline powered vehicles.

Based on the advantages over traditional gas-power vehicles, manufacturers, which generally produce traditional gas-powered vehicles, may desire to utilize improved vehicle technologies (e.g., regenerative braking technology) within their vehicle lines. Often, these manufacturers may utilize one of their traditional vehicle platforms as a starting point. Accordingly, since traditional gas-powered vehicles are designed to utilize 12 volt battery systems, a 12 volt lithium ion battery may be used to supplement a 12 volt lead-acid battery. More specifically, the 12 volt lithium ion battery may be used to more efficiently capture electrical energy generated during regenerative braking and subsequently supply electrical energy to power the vehicle's electrical system.

As advancements occur with vehicle technologies, high voltage electrical devices may also be included in the vehicle's electrical system. For example, the lithium ion battery may supply electrical energy to an electric motor in a mild-hybrid vehicle. Often, these high voltage electrical devices utilize voltage greater than 12 volts, for example, up to 48 volts. Accordingly, in some embodiments, the output voltage of a 12 volt lithium ion battery may be boosted using a DC-DC converter to supply power to the high voltage devices. Additionally or alternatively, a 48 volt lithium ion battery may be used to supplement a 12 volt lead-acid battery. More specifically, the 48 volt lithium ion battery may be used to more efficiently capture electrical energy generated during regenerative braking and subsequently supply electrical energy to power the high voltage devices.

Thus, the design choice regarding whether to utilize a 12 volt lithium ion battery or a 48 volt lithium ion battery may depend directly on the electrical devices included in a particular vehicle. Nevertheless, although the voltage characteristics may differ, the operational principles of a 12 volt lithium ion battery and a 48 volt lithium ion battery are generally similar. More specifically, as described above, both may be used to capture electrical energy during regenerative braking and subsequently supply electrical energy to power electrical devices in the vehicle.

Accordingly, to simplify the following discussion, the present techniques will be described in relation to a battery system with a 12 volt lithium ion battery and a 12 volt lead-acid battery. However, one of ordinary skill in art is able to adapt the present techniques to other battery systems, such as a battery system with a 48 volt lithium ion battery and a 12 volt lead-acid battery, or even a 12 volt lead-acid battery or 12 volt lithium ion battery by themselves.

The present disclosure relates to batteries and battery modules. More specifically, the present disclosure relates to current control of lithium ion batteries. Particular embodiments are directed to lithium ion battery cells that may be used in vehicular contexts (e.g., hybrid electric vehicles or traditional gasoline powered vehicles) as well as other energy storage/expending applications (e.g., energy storage for an electrical grid).

More specifically, the present disclosure relates to controlling current flow from a battery to a load and/or from the load to the battery. When a battery charges or discharges, it may be advantageous to limit current flow in a particular direction upon coupling the battery to a load to lessen the likelihood of current backflow in an undesired direction. To reduce the likelihood of current backflow while still maintaining an efficient charge or discharge rate, switches (e.g., power metal-oxide-semiconductor field-effect transistors (MOSFETs)) may be actively controlled to prevent the current from abruptly changing directions into or out of the battery.

With the preceding in mind, the present disclosure describes techniques for controlling charging and discharging operations of a battery system to prevent the batteries from experiencing current backflow. Traditional methods of controlling charge operations generally do not allow a mechanism for charging and discharging the battery at a low current level without the risk of experiencing undesired backflow current. For example, traditional methods may include variations of power relays that couple and decouple the battery to the electrical load. Such power relays lack the ability to control current in a desired direction, have a limited operational lifespan, may produce electromagnetic interference, and have relatively slow reaction times, among other drawbacks. In contrast, a battery management system described in the present disclosure may control switches that couple and decouple the battery to the electrical system based on current measurements to control the charging and discharging operations of the battery and avoid undesired backflow current. Thus, the techniques described herein enable a battery to experience increased reliability and performance.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
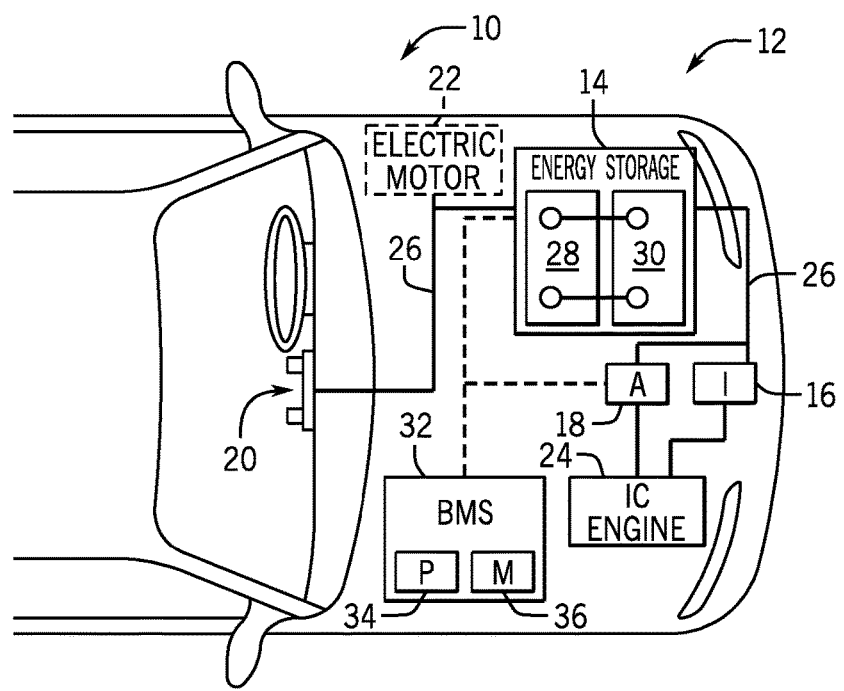
FIG. 2 is a cutaway schematic view of the xEV of FIG. 1 in the form of a hybrid electric vehicle (HEV), in accordance with an embodiment of the present approach.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20 and the ignition system 16, which may be used to start (e.g., crank) an internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator 18 and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20. Accordingly, when a 12 volt battery system 12 is used, the bus 26 may carry electrical power typically between 8-18 volts.

Additionally, as depicted, the energy storage component 14 may include multiple battery modules. For example, in the depicted embodiment, the energy storage component 14 includes a lead acid (e.g., a first) battery module 28 in accordance with present embodiments, and a lithium ion (e.g., a second) battery module 30, where each battery module 28, 30 includes one or more battery cells. In other embodiments, the energy storage component 14 may include any number of battery modules. Further, the energy storage component 14 may also include an ultracapacitor or a plurality of ultracapacitors arranged within the storage component 14. Additionally, although the first battery module 28 and the second battery module 30 are depicted adjacent to one another, they may be positioned in different areas around the vehicle. For example, the second battery module 30 may be positioned in or about the interior of the vehicle 10 while the first battery module 28 may be positioned under the hood of the vehicle 10.

In some embodiments, the energy storage component 14 may include multiple battery modules to utilize multiple different battery chemistries. For example, the first battery module 28 may utilize a lead-acid battery chemistry and the second battery module 30 may utilize a lithium ion battery chemistry. In such an embodiment, the performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate supply of power from the battery system 12 to the various components in the vehicle's electrical system (e.g., HVAC system and vehicle console 20), the energy storage component 14 (i.e., battery module) includes a first terminal 32 and a second terminal 34. In some embodiments, the second terminal 34 may provide a ground connection and the first terminal 32 may provide a positive voltage ranging between 7-18 volts. In other embodiment, the first terminal 32 may provide a positive voltage ranging up to 48 volts, 54 volts, or greater.

As previously noted, the energy storage component 14 may have dimensions comparable to those of a typical lead-acid battery to limit modifications to the vehicle 10 design to accommodate the battery system 12. For example, the energy storage component 14 may be of similar dimensions to an H6 battery, which may be approximately 13.9 inches×6.8 inches×7.5 inches. As depicted, the energy storage component 14 may be included within a single continuous housing. In other embodiments, the energy storage component 14 may include multiple housings coupled together (e.g., a first housing including the first battery 28 and a second housing including the second battery 30). In still other embodiments, as mentioned above, the energy storage component 14 may include the first battery module 28 located under the hood of the vehicle 10, and the second battery module 30 may be located within the interior of the vehicle 10.

The energy storage component 14 may include the first terminal 32, the second terminal 34, the first battery 28 (e.g., a lead acid battery), the second battery 30 (e.g., a lithium ion battery), and a battery management system 36. As used herein, the battery management system 36 generally refers to control components that control operation of the battery system 12, such as control switches within the battery module 28 and/or 30 or switches in the alternator 18. Additionally, the battery management system 36 may be disposed within the energy storage component 14, or the battery management system 36 may be remote to the energy storage component 14, as depicted in FIG. 2. The operation of the energy storage component 14 may be controlled by the battery management system 36. For example, the battery management system 36 may regulate an amount of electrical energy captured/supplied by each battery module 28 or 30 (e.g., to de-rate and re-rate the battery system 12), perform load balancing between the battery modules 28, 30, control charging and discharging of the battery modules 28, 30 (e.g., via control switches), determine a state of charge of each battery module 28, 30 and/or the entire energy storage component 14, activate an active cooling mechanism, activate a short circuit protection system, and the like.

Accordingly, the battery management system 36 may include a memory 38 and a processor 40 programmed to execute control algorithms for performing such tasks. More specifically, the processor 40 may include one or more application specific integrated circuits (ASICs), one or more field programmable gate arrays (FPGAs), one or more general purpose processors, or any combination thereof. Additionally, the memory 38 may include volatile memory, such as random access memory (RAM), and/or non-volatile memory, such as read-only memory (ROM), optical drives, hard disc drives, or solid-state drives. In some embodiments, the battery management system 36 may include portions of a vehicle control unit (VCU) and/or a separate battery control module. Additionally, as depicted, the battery management system 36 may be included separate from the energy storage component 14, such as a standalone module. In other embodiments, the battery management system 36 may be included within the energy storage component 14.

Further, the battery management system 36 may interact with sensors coupled to the energy storage component 14. For example, the battery management system 36 may receive temperature indication from a temperature sensor coupled to the energy storage component 14. The battery management system 36 may also measure current and voltage applied to or withdrawn from the energy storage component 14.

Additionally, as depicted in FIG. 2, the first battery 28 and the second battery 30 are connected in parallel across the first terminal 32 and the second terminal 34 to enable charging and discharging of the batteries. As described above, the battery terminals 32 and 34 may output the power stored in the energy storage component 14 to provide power to the electrical system of the vehicle 10. Further, the battery terminals 32 and 34 may also input power to the energy storage component 14 to enable the first battery 28 and the second battery 30 to charge, for example, when the alternator 18 generates electrical power through regenerative braking.

Figure 3:
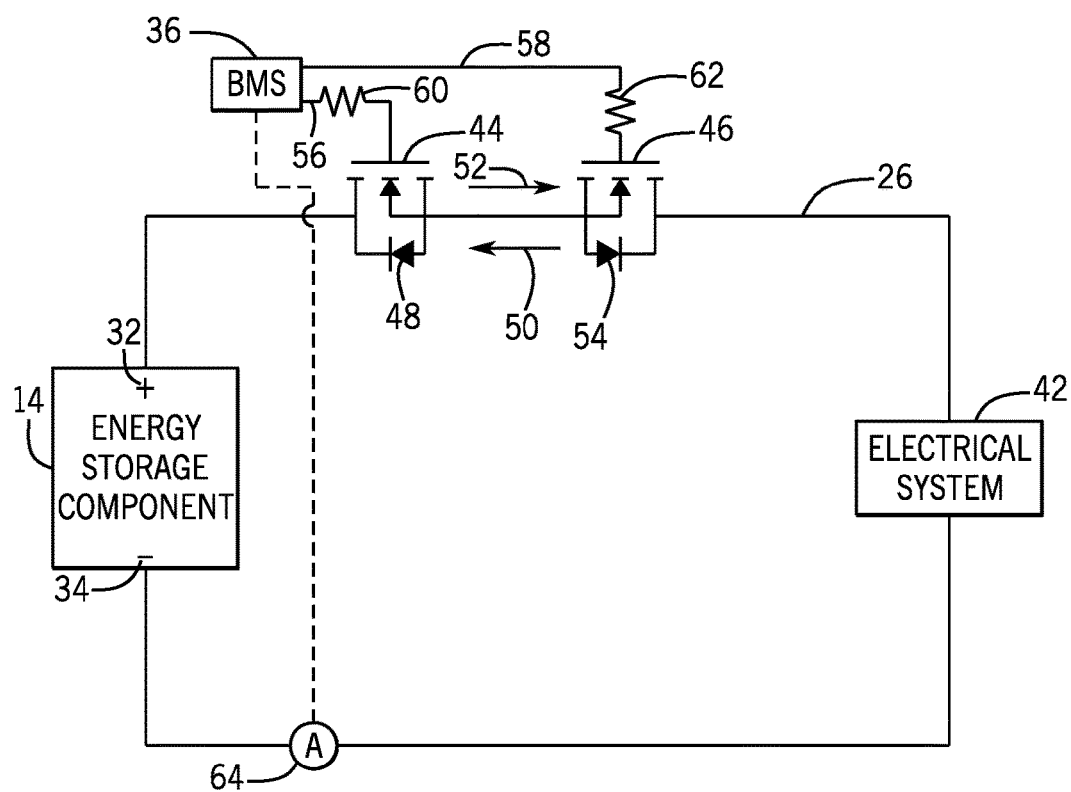
FIG. 3 is a schematic diagram of an energy storage component and vehicle electrical system architecture, in accordance with an embodiment of the present approach.

Turning now to FIG. 3, a schematic diagram of the energy storage component 14 and a vehicle electrical system 42 is depicted. As discussed above, the vehicle electrical system 42, may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Further, as illustrated in FIG. 1, the electrical system 42 of the vehicle 10 may also include the vehicle console 20, the ignition system 16, which may be used to start (e.g., crank) the internal combustion engine 24, and/or the electric motor 22.

Also provided in FIG. 3 is a pair of power metal-oxide-semiconductor field-effect transistors (MOSFETs) 44 and 46 arranged between the energy storage component 14 and the electrical system 42. The power MOSFETs 44 and 46 may be oppositely orientated from one another, as illustrated. For example, an intrinsic diode 48 of the power MOSFET 44 may enable a flow of current in a direction 50 toward the energy storage component 14 while preventing a flow of current in a direction 52 toward the electrical system 42 when the power MOSFET 44 is not activated. Conversely, an intrinsic diode 54 of the power MOSFET 46 may enable a flow of current in a direction 52 toward the electrical system 42 while preventing a flow of current in a direction 50 toward the energy storage component 14 when the power MOSFET 44 is not activated. In such an arrangement, current may still flow in the direction 52 from the energy storage component 14 toward the electrical system 42 when the power MOSFET 44 is activated and the power MOSFET 46 is not activated. Additionally, current may flow in the direction 50 from the electrical system 42 to the energy storage component 14 when the power MOSFET 46 is activated and the power MOSFET 46 is not activated. Further, the arrangement may also enable the flow of current in either the direction 50 or the direction 52 when both of the power MOSFETS 44 and 46 are activated, and the arrangement may prevent the flow of current in both the direction 50 and the direction 52 when both of the power MOSFETS 44 and 46 are not activated.

The battery management system 36 may be used to control the operation of the power MOSFETS 44 and 46. For example, the battery management system 36 may provide an activation signal along gate lines 56 and 58 to control operation of the power MOSFETS 44 and 46, respectively. By providing a high signal along the gate lines 56 and/or 58, the power MOSFETS 44 and/or 46 are activated. Activating the power MOSFETS 44 and 46 generates a low resistance path across a portion of the bus 26 along which the power MOSFETS 44 and/or 46 are positioned. The low resistance paths enable current to flow freely across the power MOSFETS 44 and 46. Additionally, the gate lines 56 and 58 may include resistors 60 and 62, respectively, positioned between the battery management system 36 and the power MOSFETS 44 and 46. The resistors 60 and 62 may include approximately 10 Ohms of resistance, although other resistances are also contemplated. Further, the resistors 60 and 62 may provide a current limiting functionality by limiting current provided from the battery management system 36 to gates of the power MOSFETS 44 and 46.

The battery management system 36 may control the power MOSFETS 44 and 46 based on a current measurement received from an ammeter 64 positioned between the electrical system 42 and the negative terminal 34 of the energy storage component 14. As discussed in greater detail below in the discussion of FIG. 4, the battery management system 36 may receive the current measurement and control the power MOSFETS 44 and 46 based on whether the current measurement reads above or below a predetermined current threshold. In particular, to prevent backflow current to the energy storage component 14 or the electrical system 42, the battery management system 36 may control only one of the power MOSFETS 44 or 46 to an active state when the current measurement is below the predetermined threshold voltage. In this manner, should the current flowing from or to the energy storage component 14 unexpectedly reverse polarity, the power MOSFET 44 or 46 that is not activated will prevent the flow of current in the undesired direction 50 or 52. Further, it may be appreciated that while the ammeter 64 is depicted coupled between the negative terminal 34 of the energy storage component 14 and the electrical system 42, the ammeter 64 may also be located along the bus 26 coupled between the positive terminal 32 and the electrical system 42.

It may be appreciated that while the power MOSFETs 44 and 46 are depicted as individual power MOSFETs in FIG. 3, to reduce the effect of intrinsic resistances of the power MOSFETs 44 and 46 when the power MOSFETs 44 and 46 are active, multiple power MOSFETs 44 and 46 may be electrically coupled in parallel. Thus, the power MOSFETs 44 and 46 may each represent sets of power MOSFETs in parallel. That is, multiple power MOSFETs 44 may be coupled in parallel with each other and multiple power MOSFETs 46 may be coupled in parallel with each other. For example, in some embodiments, 2, 3, 4, or more power MOSFETs 44 and 46 may be coupled in parallel with each other. Because each additional power MOSFET 44 or 46 added in parallel with the other power MOSFETs 44 or 46 reduces a total resistance across the power MOSFETs 44 or 46, less power dissipation across the power MOSFETs 44 and 46 may be experienced as a number of power MOSFETs 44 and 46 provided in parallel increases. Moreover, the power MOSFETs 44 may all receive a single activation signal from the gate line 56, and the power MOSFETs 46 may all receive a single activation signal from the gate line 58. In this manner, the power MOSFETs 44 may be controlled substantially simultaneously with each other, and the power MOSFETs 46 may also be controlled substantially simultaneously with each other.

Furthermore, while the energy storage component 14 is depicted in FIG. 2 as a combination of two battery modules 28 and 30, it may be appreciated that the energy storage component 14 may include a single battery module 28 or 30 (e.g., a single lead-acid battery or a single lithium ion battery). Additionally, while the power MOSFETs 44 and 46 are depicted in a position between the energy storage component 14 and the electrical system 42, the power MOSFETs 44 and 46, in some embodiments, may be positioned within the energy storage component 14. For example, each of the battery modules 28 and 30 may have a pair of the power MOSFETs 44 and 46 that individually couple the battery modules 28 and 30 to the electrical system 42. It may also be appreciated that the power MOSFETs 44 and 46 may also be any other type of semiconductor switching device. For example, the other semiconductor switching devices may include an insulated-gate bipolar transistor (IGBT) or a thyristor. Further, if another type of semiconductor switching device does not include the intrinsic diode 48 or 54, then the intrinsic diode 48 or 54 may be replaced by a traditional diode when a semiconductor switching device without the intrinsic diode 48 or 54 is used. Additionally, in some embodiments, multiple traditional diodes may be provided in parallel with one another and their respective semiconductor switching device to reduce total power dissipation of the diodes.

Figure 4:
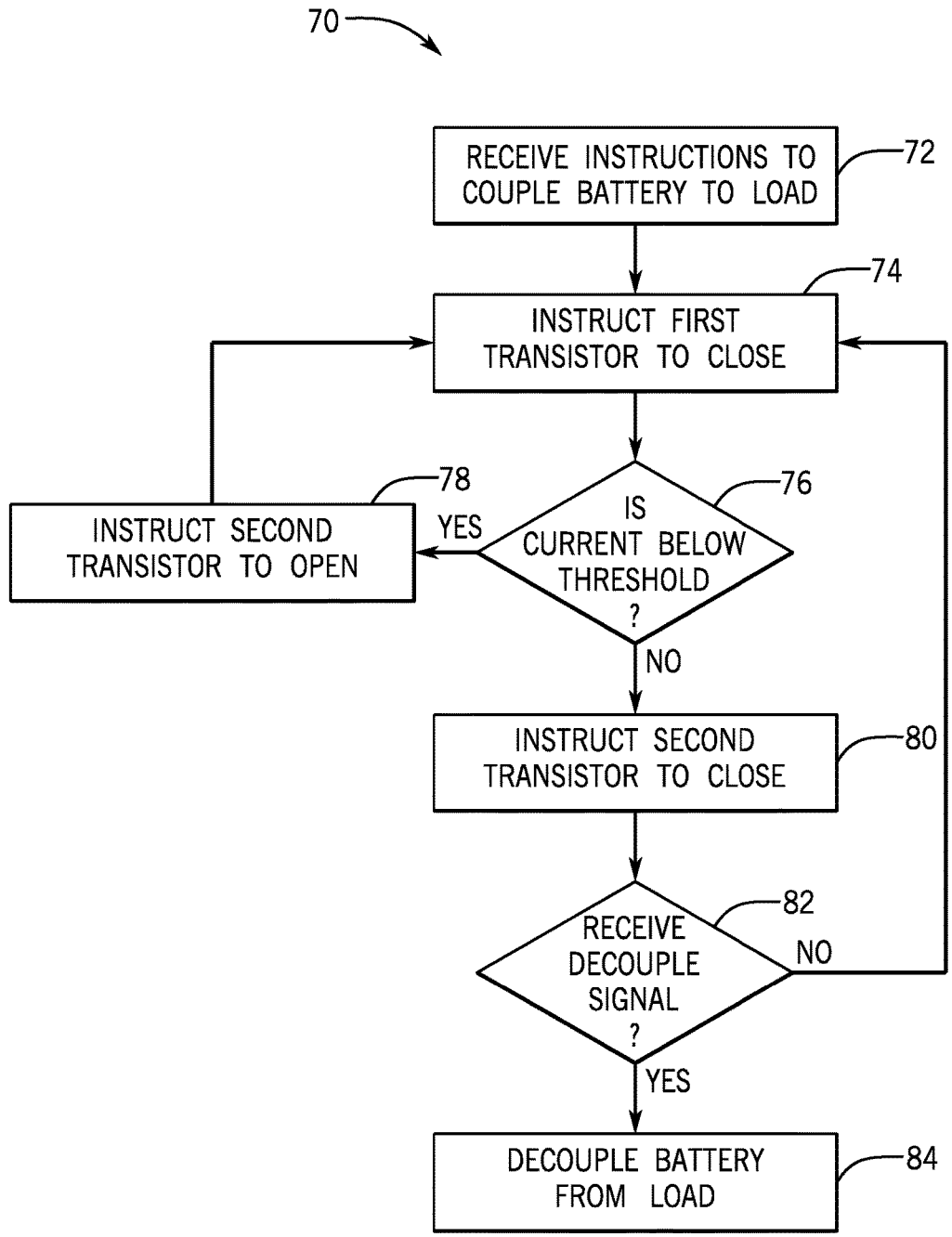
FIG. 4 is a process flow diagram describing an embodiment of a method for controlling current to and from the energy storage component of FIG. 3, in accordance with an embodiment of the present approach.

FIG. 4 is a process flow diagram describing an embodiment of a method 70 for controlling a flow of current to and from the energy storage component 14. Initially, at block 72, the battery management system 36 receives instructions to couple a battery (e.g., the energy storage component 14) to a load (e.g., the electrical system 42). The instructions to couple the battery to the load may be the result of cranking the internal combustion engine 24 of the vehicle 10 or turning on an electrical component of the vehicle 10 that draws power from the energy storage component 14.

At block 74, the battery management system 36 may instruct the power MOSFET 44 to activate. By activating the power MOSFET 44, current may flow in the direction 52 across the power MOSFET 44 and across the intrinsic diode 54 of the power MOSFET 46 toward the electrical system 42. Additionally, the intrinsic diode 54 may prevent the backflow of current in the direction 50 from the electrical system 42.

Subsequently, at block 76, the battery management system 36 determines whether the current measured from the ammeter 64 is below a predetermined threshold current. The predetermined threshold current may be in the range of approximately 1-3 amperes. As the current across the intrinsic diode 54 increases, power dissipated across the intrinsic diode 54 increases, and a temperature of the intrinsic diode 54 may also increase. Accordingly, to limit power dissipation and excessive temperature at the intrinsic diode 54, the predetermined threshold current may be established.

If the measured current is below the predetermined threshold current, at block 78, the battery management system 36 may provide or continue to provide a deactivation signal the power MOSFET 46 to deactivate the power MOSFET 46 or to maintain the power MOSFET 46 in a deactivated state. Upon deactivating the power MOSFET 46, the method 70 may return to block 74 and continue to provide an activation signal to the power MOSFET 44 to maintain the power MOSFET 44 in an activated state. The loop of blocks 74, 76, and 78 may repeat until the measured current exceeds the predetermined threshold current.

When the measured current exceeds the predetermined threshold current, at block 80, the battery management system 36 may provide an activation signal to the power MOSFET 46 to activate the power MOSFET 46. Because both the power MOSFET 44 and the power MOSFET 46 are in an activated state, the power dissipated across the power MOSFETs 44 and 46 is limited due to the current flow path not including a flow across either of the intrinsic diodes 48 or 54. Accordingly, the system may operate in a state of heightened efficiency while both of the power MOSFETs 44 and 46 are activated.

At block 82, the battery management system 36 makes a determination as to whether a decouple signal has been received by the battery management system 36. The decouple signal may be a result of an indication that the vehicle 10 has been turned off, a result of the energy storage component 14 reaching a low capacity threshold, or any other situation in which decoupling the energy storage component 14 from the electrical system 42 is beneficial. If a decouple signal has not been received by the battery management system 36, the method 70 may return to block 74 and continue to provide an activation signal to the power MOSFET 44 and the power MOSFET 46 to maintain the power MOSFET 44 and the power MOSFET 46 in activated states.

Alternatively, if a decouple signal is received by the battery management system 36, at block 84, the energy storage component 14 may be removed from the electrical system 42. At this juncture, the battery management system 36 may maintain the power MOSFETs 44 and 46 in deactivated states until the battery management system 36 again receives instruction to couple the energy storage component 14 to the electrical system 42, at block 72. Upon receiving these instructions, the method 70 may be repeated.

It may be appreciated that in some situations, such as during regenerative braking, it may be beneficial for the current to flow across the power MOSFETs 44 and 46 in the direction 50. In such a situation, at block 74, the battery management system 36 provides an activation signal to the power MOSFET 46 instead of the power MOSFET 44. By activating the power MOSFET 46, current may flow in the direction 50 across the power MOSFET 46 and across the intrinsic diode 48 of the power MOSFET 44 toward the energy storage component 14. Additionally, the intrinsic diode 48 may prevent the backflow of current in the direction 52 toward the electrical system 42.

Subsequently, at block 76, the battery management system 36 determines whether the current measured from the ammeter 64 is below a predetermined threshold current. The predetermined threshold current may be in the range of 1-3 amperes. As the current across the intrinsic diode 48 increases, power dissipated across the intrinsic diode 48 increases, and a temperature of the intrinsic diode 48 may also increase. Accordingly, to limit power dissipation and excessive temperature at the intrinsic diode 48, the predetermined threshold current may be established.

If the measured current is below the predetermined threshold current, at block 78, the battery management system 36 may provide or continue to provide a deactivation signal the power MOSFET 44 to deactivate the power MOSFET 44 or to maintain the power MOSFET 44 in a deactivated state. Upon deactivating the power MOSFET 44, the method 70 may return to block 74 and continue to provide an activation signal to the power MOSFET 46 to maintain the power MOSFET 46 in an activated state. The loop of blocks 74, 76, and 78 may repeat until the measured current exceeds the predetermined threshold current.

When the measured current exceeds the predetermined threshold current, at block 80, the battery management system 36 may provide an activation signal to the power MOSFET 44 to activate the power MOSFET 44. Because both the power MOSFET 46 and the power MOSFET 44 are in an activated state, the power dissipated across the power MOSFETs 44 and 46 is limited because the current flow path does not include flow across either of the intrinsic diodes 48 or 54. Accordingly, the system may operate in a state of heightened efficiency while both of the power MOSFETs 44 and 46 are activated.

At block 82, the battery management system 36 makes a determination as to whether a decouple signal has been received by the battery management system 36. The decouple signal may be a result of an indication that the vehicle 10 has been turned off, a result of the energy storage component 14 reaching a low capacity threshold, or a result of any other situation in which decoupling the energy storage component 14 from the electrical system 42 is beneficial. If a decouple signal has not been received by the battery management system 36, the method 70 may return to block 74 and continue to provide an activation signal to the power MOSFET 44 and the power MOSFET 46 to maintain the power MOSFET 44 and the power MOSFET 46 in activated states.

Alternatively, if a decouple signal is received by the battery management system 36, at block 84, the energy storage component 14 may be removed from the electrical system 42. At this juncture, the battery management system 36 may maintain the power MOSFETs 44 and 46 in deactivated states until the battery management system 36 again receives instruction to couple the energy storage component 14 to the electrical system 42, at block 72. Upon receiving these instructions, the method 70 may be repeated.

One or more of the disclosed embodiments, alone or on combination, may provide one or more technical effects including decreasing the likelihood undesired backflow current effects on the energy storage component 14 or the electrical system 42 of the vehicle 10. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the disclosed subject matter. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery system, comprising:
an energy storage component configured to be selectively coupled to an electrical system;
a first semiconductor switching device and a second semiconductor switching device coupled in series between the energy storage component and the electrical system;
a first diode coupled in parallel with the first semiconductor switching device and a second diode coupled in parallel with the second semiconductor switching device;
a battery management system communicatively coupled to the first semiconductor switching device and the second semiconductor switching device, wherein the battery management system is configured to:
determine a measured current flow indicative of temperature of the first diode while the first semiconductor switching device is in a deactivated state and the second semiconductor switching device is in an activated state;
determine a current threshold that is indicative of a maximum desired diode temperature; and
instruct the first semiconductor switching device to switch from the deactivated position to the activated state when the measured current flow is greater than the current threshold to facilitate maintaining temperature of the first diode less than the maximum desired diode temperature.

2. The battery system of claim 1, wherein the first semiconductor switching device comprises a first power metal-oxide-semiconductor field-effect transistor (MOSFET) and the second semiconductor switching device comprises a second power MOSFET.

3. The battery system of claim 2, wherein the first power MOSFET and the second power MOSFET are arranged in an opposite orientation from one another.

4. The battery system of claim 2, wherein the first diode comprises a first intrinsic diode of the first MOSFET and the second diode comprises a second intrinsic diode of the second MOSFET.

5. The battery system of claim 1, wherein the battery management system is configured to instruct the first semiconductor switching device to maintain the deactivated state and the second semiconductor switching device to maintain the activated state to enable current flow through the first diode when the measured current flow is not greater than the current threshold.

6. The battery system of claim 5, wherein the second diode is configured to enable current flow from the energy storage component to the electrical system.

7. The battery system of claim 5, wherein the second diode is configured to enable current flow from the electrical system to the energy storage component.

8. The battery system of claim 1, wherein the current threshold is less than three amperes.

9. The battery system of claim 1, comprising a third semiconductor switching device coupled in parallel with the first semiconductor switching device and a fourth semiconductor switching device coupled in parallel with the second semiconductor switching device.

10. The battery system of claim 9, wherein the first semiconductor switching device and the third semiconductor switching device are controlled with a first single activation signal, and the second semiconductor switching device and the fourth semiconductor switching device are controlled with a second single activation signal.

11. The battery system of claim 1, wherein the energy storage component comprises a first battery module with a first battery chemistry and a second battery module with a second battery chemistry.

12. The battery system of claim 1, wherein the energy storage component comprises a lithium ion battery.

13. An energy storage system, comprising:
an energy storage component;
an electrical system of a vehicle;
a first semiconductor switching device and a second semiconductor switching device coupled in series and each configured to selectively couple the energy storage component and the electrical system;
a first diode coupled in parallel with the first semiconductor switching device and a second diode coupled in parallel with the second semiconductor switching device;
a battery management system comprising a processor and one or more tangible, non-transitory machine-readable media comprising processor-executable instructions to, upon receiving an indication to couple the energy storage component to the electrical system:
provide a first signal to a first gate line of the first semiconductor switching device to activate the first semiconductor switching device;
determine a measured current of the energy storage component while the first semiconductor switching device is activated, wherein the measured current is indicative of a temperature of the second diode;
provide a second to a second gate line of the second semiconductor switching device to activate the second semiconductor switching device when the measured current is greater than a predetermined threshold current that is indicative of a maximum desired diode temperature to facilitate maintaining the temperature of the second diode less than the maximum desired diode temperature.

14. The energy storage system of claim 13, wherein the first semiconductor switching device comprises a first power metal-oxide-semiconductor field-effect transistor (MOSFET) and the first diode comprises an first intrinsic diode of the first power MOSFET.

15. The energy storage system of claim 13, wherein the predetermined threshold current is between one and three amperes.

16. The energy storage system of claim 13, comprising a third diode coupled in parallel with the first diode and the first semiconductor switching device, and a fourth diode coupled in parallel with the second diode and the second semiconductor switching device.

17. A tangible, non-transitory computer readable medium of a battery management system configured to store instructions executable by a processor, wherein the instructions comprise instructions to cause the processor to:
provide a first signal to a first gate line of a first semiconductor switching device to activate the first semiconductor switching device, wherein activating the first semiconductor switching device enables a current to flow from an energy storage component across the first semiconductor switching device, through a diode coupled in series with the first semiconductor switching device, and to an electrical system;
receive a measured current of the energy storage component, wherein the measured current is indicative of temperature of the diode;
determine a current threshold that is indicative of a maximum desired diode temperature;
provide a second signal to a second gate line of a second semiconductor switching device to activate the second semiconductor switching device when the measured current is greater than the current threshold to facilitate maintaining the temperature of the diode below the maximum desired diode temperature, wherein activating the second semiconductor switching device enables the current to flow from the first semiconductor switching device, across the second semiconductor switching device, and to the electrical system.

18. The computer readable medium of claim 17, wherein the diode coupled in series with the first semiconductor switching device comprises an intrinsic diode of the second semiconductor switching device.

19. The computer readable medium of claim 17, wherein the predetermined threshold current is less than three amperes.

20. The computer readable medium of claim 17, wherein the first semiconductor switching device comprises a first power metal-oxide-semiconductor field-effect transistor (MOSFET) and the second semiconductor switching device comprises a second power MOSFET.

21. The computer readable medium of claim 17, wherein the instructions comprise instructions to cause the processor to:
provide the first signal to a third semiconductor switching device coupled in parallel with the first semiconductor switching device; and
provide the second signal to a fourth semiconductor switching device coupled in parallel with the second semiconductor switching device.

* * * * *

UNITED STATES PATENT AND TRADEMARK OFFICE
CERTIFICATE OF CORRECTION

PATENT NO. : 10,076,969 B2
APPLICATION NO. : 15/189741
DATED : September 18, 2018
INVENTOR(S) : Ronald J. Dulle It is certified that error appears in the above-identified patent and that said Letters Patent is hereby corrected as shown below:

On the Title Page

In Line 1 of item (74), delete "Fletcher Yoder, P.C" and insert -- Fletcher Yoder, P.C. --, therefor.

In Line 3 of item (57), delete "the couples" and insert -- that couples --, therefor.

In the Specification

In Column 1, Line 40, delete "full hybrid systems" and insert -- full hybrid electric vehicles --, therefor.

In Column 1, Line 43, delete "mild hybrid systems" and insert -- mild hybrid electric vehicles --, therefor.

In Column 2, Line 38, delete "the couples" and insert -- that couples --, therefor.

In Column 3, Line 11, delete "singal" and insert -- signal --, therefor.

In Column 3, Line 28, delete "semicondcutor" and insert -- semiconductor --, therefor.

In Column 3, Line 34, delete "singal" and insert -- signal --, therefor.

In Column 3, Line 52, delete "DRAWINGS" and insert -- BRIEF DESCRIPTION OF DRAWINGS --, therefor.

In Column 3, Line 57, delete "is perspective" and insert -- is a perspective --, therefor.

In Column 3, Line 60, delete "approach;." and insert -- approach; --, therefor.

Signed and Sealed this
Twelfth Day of February, 2019

Andrei Iancu
*Director of the United States Patent and Trademark Office*

In Column 9, Line 28, delete "power MOSFETS 44 and 46" and insert -- power MOSFETs 44 and 46 --, therefor.

In Column 9, Lines 30-31, delete "power MOSFETS 44 and 46" and insert -- power MOSFETs 44 and 46 --, therefor.

In Column 9, Line 33, delete "power MOSFETS 44 and 46" and insert -- power MOSFETs 44 and 46 --, therefor.

In Column 9, Line 36, delete "power MOSFETS 44 and 46" and insert -- power MOSFETs 44 and 46 --, therefor.

In Column 9, Line 38, delete "power MOSFETS 44 and/or 46" and insert -- power MOSFETs 44 and/or 46 --, therefor.

In Column 9, Line 39, delete "power MOSFETS 44 and 46" and insert -- power MOSFETs 44 and 46 --, therefor.

In Column 9, Lines 40-41, delete "power MOSFETS 44 and/or 46" and insert -- power MOSFETs 44 and/or 46 --, therefor.

In Column 9, Lines 42-43, delete "power MOSFETS 44 and 46" and insert -- power MOSFETs 44 and 46 --, therefor.

In Column 9, Lines 45-46, delete "power MOSFETS 44 and 46" and insert -- power MOSFETs 44 and 46 --, therefor.

In Column 9, Line 51, delete "power MOSFETS 44 and 46" and insert -- power MOSFETs 44 and 46 --, therefor.

In Column 9, Line 53, delete "power MOSFETS 44 and 46" and insert -- power MOSFETs 44 and 46 --, therefor.

In Column 9, Line 59, delete "power MOSFETS 44 and 46" and insert -- power MOSFETs 44 and 46 --, therefor.

In Column 9, Line 64, delete "power MOSFETS 44 or 46" and insert -- power MOSFETs 44 or 46 --, therefor.

In the Claims

In Column 15, Line 7, in Claim 14, delete "an first" and insert -- a first --, therefor.